(12) United States Patent
Bang (10) Patent No.: US 9,167,100 B2
(45) Date of Patent: Oct. 20, 2015

(54) GAS DETECTION SYSTEM AND METHOD USING SMART PHONE

(76) Inventor: Young-ki Bang, Ansan-si (KR)

(*) Notice: Subject to any disclaimer, the term of this patent is extended or adjusted under 35 U.S.C. 154(b) by 0 days.

(21) Appl. No.: 14/002,980

(22) PCT Filed: Jun. 15, 2012

(86) PCT No.: PCT/KR2012/004715
§ 371 (c)(1),
(2), (4) Date: Sep. 3, 2013

(87) PCT Pub. No.: WO2013/115438
PCT Pub. Date: Aug. 8, 2013

(65) Prior Publication Data
US 2014/0349707 A1      Nov. 27, 2014

(30) Foreign Application Priority Data
Feb. 1, 2012   (KR) .................. 10-2012-0010137

(51) Int. Cl.
*H04M 11/04*   (2006.01)
*G08B 1/08*    (2006.01)
*H04M 11/00*   (2006.01)
*H04Q 9/00*    (2006.01)
*H04M 1/02*    (2006.01)

(52) U.S. Cl.
CPC .......... *H04M 11/002* (2013.01); *H04M 1/0202* (2013.01); *H04Q 9/00* (2013.01); *H04Q 2209/40* (2013.01); *H04Q 2209/47* (2013.01); *H04Q 2209/823* (2013.01)

(58) Field of Classification Search
CPC .............. G01N 33/0004; G01N 27/00; G01N 33/4972; H04M 11/002; H04M 1/0202; H04M 11/00; H04M 1/02; H04M 1/72527; H04M 1/7253; H04M 2250/12; H04M 2250/10; H04M 1/72541; H04Q 9/00; H04Q 2209/823

USPC ........... 455/404.1, 90.1, 404.2, 414.2, 556.1, 455/414.1, 415, 66.1, 557; 340/539.11
See application file for complete search history.

(56) References Cited

U.S. PATENT DOCUMENTS

| | | | |
|---|---|---|---|
| 2011/0003664 A1* | 1/2011 | Richard | 482/8 |
| 2012/0218123 A1* | 8/2012 | Ji et al. | 340/870.07 |
| 2012/0268268 A1* | 10/2012 | Bargero | 340/539.11 |
| 2013/0092843 A1* | 4/2013 | Turqueti et al. | 250/369 |
| 2013/0289367 A1* | 10/2013 | Kruglick et al. | 600/302 |
| 2014/0165698 A1* | 6/2014 | Mochizuki et al. | 73/23.3 |
| 2014/0216136 A1* | 8/2014 | Yim | 73/31.05 |
| 2014/0335905 A1* | 11/2014 | Bhoot | 455/466 |
| 2014/0337621 A1* | 11/2014 | Nakhimov | 713/168 |

* cited by examiner

*Primary Examiner* — Pablo Tran
(74) *Attorney, Agent, or Firm* — John K. Park; Park Law Firm (57) ABSTRACT

Disclosed is a gas detection system and method using a smart phone. The gas detection system includes a sensor module detachably mounted to the smart phone and configured to detect and measure a combustible gas or a toxic gas; and a gas detection APP installed inside the smart phone and configured to acquire measurement data by detecting the combustible gas or the toxic gas and measuring the detected combustible gas or toxic gas through the drive of the sensor module, after automatically recognizing user information and location information by reading a radio frequency identification (RFID) tag indicating a user or a location of gas detection, using a contact unit having built therein an RFID reader inside the smart phone, wherein the smart phone transmits the user information, the location information and the measurement data acquired from the gas detection APP to an operation server through a communication network.

4 Claims, 5 Drawing Sheets

GAS DETECTION SYSTEM AND METHOD USING SMART PHONE

CROSS-REFERENCE TO RELATED APPLICATIONS

This application claims the benefit of Korean Patent Application No. 10-2012-0010137, filed on Feb. 1, 2012 in the Korean Intellectual Property Office, which is incorporated herein by reference in its entirety.

BACKGROUND OF THE INVENTION

1. Field of the Invention

The present invention relates to a gas detection system and method using a smart phone, and more specifically, to a gas detection system and method using a smart phone, which can secure reliability of data on the inspection location and inspection result when gas is measured for a user, by minimizing artificial manipulation and input error of an inspector.

2. Description of Related Art

A conventional gas detection method entails a problem in that since an inspector visits each home and inspects gas using a detector, and inputs and confirms data through a PDA based on the inspected content, efficiency is lowered due to the two kinds of works, including both inspection of gas and input of data according to the gas inspection.

In addition, when the inspector visits a building such as each home and inputs an address of an inspection target (hereinafter, referred to as "a user"), i.e., a target of inspection, and confirms the user using a PDA, an input error may occur or a decision error may be made in the input process, thereby deteriorating accuracy of data.

Furthermore, since reliability of the gas inspection is doubted due to the problems of artificial manipulation of an inspector and a mistake of the inspector in making a decision, there occurs a problem in that complaints are endlessly raised.

Specifically, first, with regard to management of the inspector, i.e., a worker, since details regarding a work performance of the inspector are reported based on the conscience of the inspector and the signature of a householder in the current working environment, there is a problem in the reliability of gas inspection.

Furthermore, with regard to reliability of the gas inspection result, the reason why doubts are constantly raised over the reliability of the gas inspection result in the current working environment is that manipulation on the handwriting record book and the PDA input is suspected.

Furthermore, with regard to work efficiency and convenience of customers, in the current working environment, an inspector should get a signature of an inspection target living in the house at the inspection location in an attempt to confirm the inspection result after performing the inspection. However, in this process, although the inspector revisits the inspection location to get a signature, the householder may refuse signing the inspection result or leave the house, inefficiency of work and inconvenience of customers may be invited due to disputes with customers.

Furthermore, with regard to safety of inspection behaviors, in the current inspection procedure, although inspection is periodically performed on a monthly basis and a result of the inspection is recorded through handwriting or a PDA and kept and managed in an office, there is a limitation in that the inspection is merely simple management of confirmation on whether or not abnormality is present and cannot analyze data and take previous measures against an expected danger such as a progressive gas leakage or the like.

Furthermore, with regard to utilization of inspection data, since most of existing inspection data are recorded through handwriting, they are just stored in a document storage room as long as leakage of gas is not detected. Although some of the data are computerized using a PDA, they are just stored but are not utilized.

Furthermore, with regard to efficiency of the detector, in the current working process, an inspector should carry a gas leakage detector, a handwriting record book, a PDA or all of these as basic equipment.

Finally, with regard to reliability of the detector, since an existing detector secures reliability of the detector only by a correction (test) record on an annual basis, reliability of a situation at the time moment where detection was performed is lowered.

Therefore, there is a need for the development of a technique for securing reliability of measurement of gas for a user by an inspector and reliability of a measured data.

SUMMARY OF THE INVENTION

Accordingly, the present invention has been made in order to solve the above-described problems occurring in the prior art, and it is an object of the present invention to provide a gas detection system and method using a smart phone, which can solve all the problems occurring by artificial manipulation of an input in confirming a user, i.e., an inspection target, or an input error about the user, using a sensor module that is detachably mounted to the smart phone and an application thereof.

Another object of the present invention is to provide a gas detection system and method using a smart phone, in which measurement data measured by a sensor module performing gas detection is transmitted to an operation server so that the measurement data can be processed as special data about a combustible gas or a toxic gas.

Still another object of the present invention is to provide a gas detection system and method using a smart phone, which can secure reliability of data on the inspection location and inspection result when gas is measured for a user.

However, the objects of the present invention are not limited to the abovementioned objects, and those skilled in the art will clearly understand unmentioned other objects from the following descriptions.

To accomplish the above objects, in accordance with an embodiment of the present invention, there is provided a gas detection system using a smart phone, including: a sensor module detachably mounted to the smart phone and configured to detect and measure a combustible gas or a toxic gas; and a gas detection APP installed inside the smart phone and configured to acquire measurement data by detecting the combustible gas or the toxic gas and measuring the detected combustible gas or toxic gas through the drive of the sensor module, after automatically recognizing user information and location information by reading a radio frequency identification (RFID) tag indicating a user or a location of gas detection, using a contact unit having built therein an RFID reader inside the smart phone, wherein the smart phone transmits the user information, the location information and the measurement data acquired from the gas detection APP to an operation server through a communication network.

In one aspect of gas detection system according to one embodiment of the present invention, the gas detection system includes: a database store the received user information, location information and measurement data.

In another aspect of gas detection system according to another embodiment of the present invention, the gas detection system includes: the operation server creates a processed data using the user information, the location information, and the measurement data, and transmits a warning message to wired and wireless terminals positioned at a location contained in information on a regional unit using the information on the regional unit previously set, centering on the location information.

In the anothers aspect of gas detection system according to another embodiment of the present invention, the gas detection system includes: if the detected gas is a combustible gas, the processed data include at least one of a gas type, a degree of danger, cautions, a gas handling method, countermeasures against an emergency case, simulated trainings, PR materials of public organizations, and general information on gas safety, as the special data, if the detected gas is a toxic gas, the processed data include at least one of information on the degree of harmfulness of the toxic gas, information on harmful gas, hazardous zones in the surroundings of life, a degree of drinking in the case of alcohol, health conditions according to drinking quantity, sharing of information on the hazardous zones, self-diagnosis in case of being exposed to a toxic gas, early measures on the hazardous zones, extraction of qualitative evaluation in the field of living environment, cautions related to health, and simplified self-diagnosis information, as the special data.

In the anothers aspect of gas detection system according to another embodiment of the present invention, the gas detection system includes: the smart phone comprises an image pickup unit that is configured to create an image data of a place where the gas detection and measurement is performed, and transmit the created image to the operation server data together with the user information, the location information and the measurement data.

In accordance with another embodiment of the present invention, there is provided a gas detection method using a smart phone, including: a first step of driving a gas detection APP installed inside the smart phone, after attaching a sensor module to the smart phone; a second step of allowing the gas detection APP to automatically recognize user information and location information by reading a radio frequency identification (RFID) tag indicating a user or a location of gas detection, using a contact unit having built therein an RFID reader inside the smart phone; a third step of allowing the gas detection APP to detect a combustible gas or a toxic gas by driving the sensor module; a fourth step of allowing the gas detection APP to acquire measurement data by measuring the detected combustible gas or toxic gas through the drive of the sensor module; and a fifth step of allowing the smart phone to transmit the user information, the location information and the measurement data acquired from the gas detection APP to an operation server through a communication network.

In one aspect of gas detection method according to one embodiment of the present invention, a sixth step of allowing the operation server to store a processed data using the user information, the location information and the measurement data.

In another aspect of gas detection method according to one embodiment of the present invention, a seventh step of allowing the operation server to create a processed data using the user information, the location information and the measurement data, and transmit a warning message to wired and wireless terminals positioned at a location contained in information on a regional unit previously set, centering on the location information using the information on the regional unit.

BRIEF DESCRIPTION OF THE DRAWINGS

The above and other objects, features and advantages of the present invention will be apparent from the following detailed description of the preferred embodiments of the invention in conjunction with the accompanying drawings, in which.

| [Explanation on symbols] | |
|---|---|
| 10: smart phone | 11: transmitting and receiving |
| 12: first control unit | 13: system memory |
| 14: driving application | 15: memory unit |
| 16: image pickup unit | 17: display unit |
| 20: sensor module | 21: contact unit |
| 22: microcomputer | 23: detection unit |
| 24: data measurement unit | 30: communication network |
| 40: operation server | 50: database |
| 60: personal computer (PC) | 100: gas detection APP |
| 101: warning part | 102: wireless transmission part |
| 103: second control part | 104: sensing part |
| 105: determination part | 106: driving part |

DESCRIPTION OF SPECIFIC EMBODIMENTS

Now, preferred embodiments of the present invention will be described in detail with reference to the accompanying drawings. In the following description, the detailed description on relevant known functions and constructions unnecessarily obscuring the subject matter of the present invention will be avoided hereinafter.

In this specification, any one constituent element 'transmit' a data or signal to another constituent element means that the constituent element may directly transmit the data or signal to the other constituent element or may transmit the data or signal to the another constituent element via at least one of another constituent element.

Figure 1:
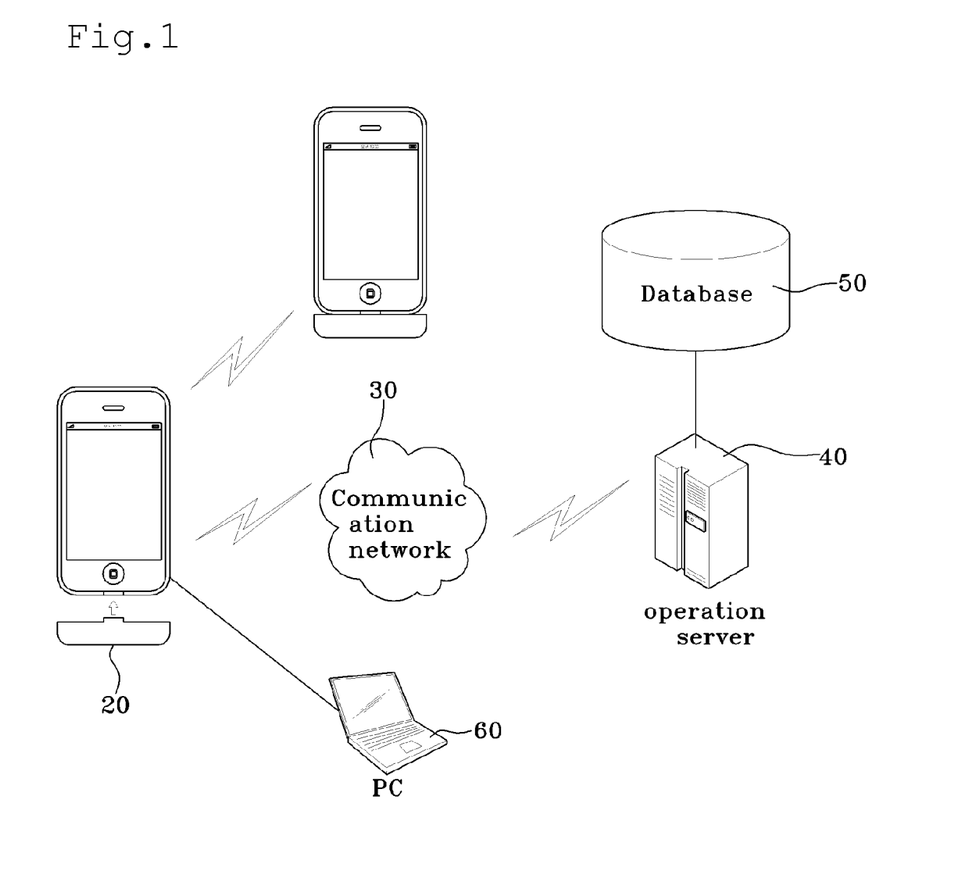
FIG. 1 is a view showing a gas detection system using a smart phone according to an embodiment of the present invention.

FIG. 1 is a view showing a gas detection system using a smart phone according to an embodiment of the present invention. Referring to FIG. 1, the gas detection system using a smart phone includes the smart phone 10, a sensor module 20, a communication network 30, an operation server 40, a database 50 and a personal computer (PC) 60.

The smart phone 10 is engaged with the sensor module 20 formed as a separate device and basically performs a function of warning a user or transmitting measurement data to the operation server 40 through the communication network 30 if the amount of gas exceeds a threshold value, under the control of a driven gas detection APP 100 using the measurement data measured by the sensor module 20 performing gas detection.

The sensor module 20 basically performs gas detection and creation of measurement data on the detected gas and may measure liquid components such as agricultural chemicals. Hereinafter, gas detection will be mainly described for the convenience of explanation.

The communication network 30 is a high-speed backbone network of a large-scale communication network capable of providing large-volume long distance voice and data services, which can be a next generation wired or wireless communication network for providing Internet or high-speed multimedia services. If the communication network 20 is a mobile communication network, it may be a synchronous or asynchronous mobile communication network. In an embodiment, the asynchronous mobile communication network may be a communication network of Wideband Code Division Multiple Access (WCDMA). In this case, although it is not shown in the figure, the mobile communication network may include a Radio Network Controller (RNC). Meanwhile, although a WCDMA network is described as an example, the mobile communication network may be a next generation network, such as a 3G LTE network, a 4G network or the like, or other IP networks based on IP. The communication network 30 performs a function of transferring signals and data among the smart phone 30, the operation server 40, the PC 60 and other system components.

The operation server 40 receives measurement data on gas, agricultural chemicals or the like measured by the sensor module 20 from the smart phone 10 and has a function of measuring a position of the smart phone 10 and warning the PC 60 and the like formed in an area around the smart phone 10.

Meanwhile, the operation server 40 may secure reliability of the measurement data absolutely free from artificial manipulation by receiving, together with the measurement data, information on a user and a position of the user obtained from the sensor module 20 formed like an accessory.

In addition, the operation server 40 may store and utilize the user information and the position information related to the measurement data, process the measurement data into special data and provide the smart phone 10 or the PC 60 with the data.

Here, if the detected gas is a combustible gas, the special data may be a gas type, a degree of danger, cautions, a gas handling method, countermeasures against an emergency case, simulated trainings, PR materials of public organizations, general information on gas safety, or the like.

In addition, if the detected gas is a toxic gas, the special data may be information on the degree of harmfulness of the toxic gas, information on harmful gas, hazardous zones in the surroundings of life, a degree of drinking in the case of alcohol, health conditions according to drinking quantity, sharing of information on the hazardous zones, self-diagnosis in case of being exposed to a toxic gas, early measures on the hazardous zones, extraction of qualitative evaluation in the field of living environment, cautions related to health, simplified self-diagnosis information, or the like.

The database 50 receives the measurement data from the operation server 40 and stores the measurement data. In addition, the database 50 in this specification may be a functional and structural combination of hardware and software for storing information corresponding to each database. The database 50 may be implemented in at least one table and further include a separate Database Management System (DBMS) for searching, storing and managing the information stored in the database. In addition, the database 50 may be implemented in a variety of forms such as a linked-list, a tree, a relational database and the like and includes all kinds of data storage media and data structures corresponding to the database and capable of storing information.

Figure 2:
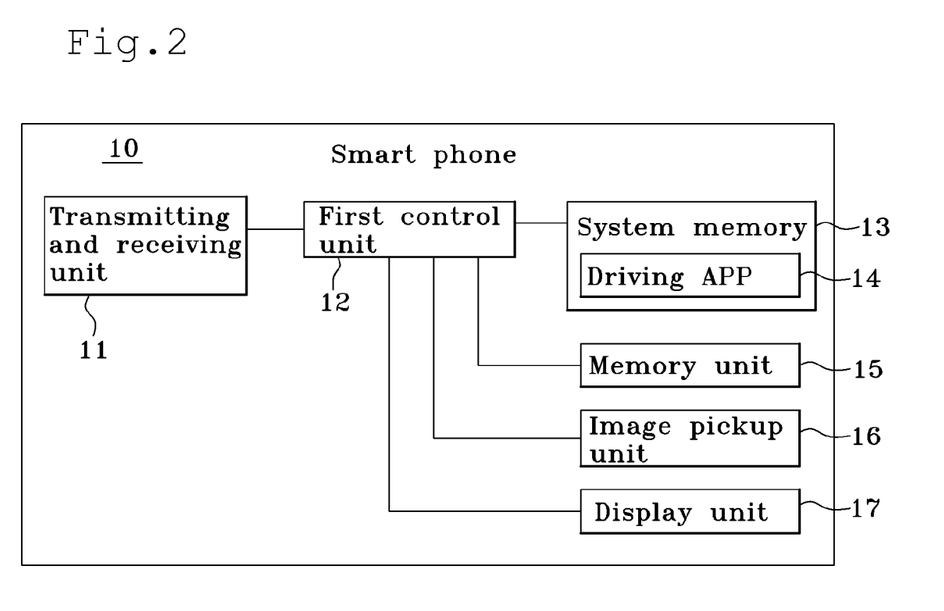
FIG. 2 is a view showing the configuration of the smart phone in FIG. 1.

FIG. 2 is a view showing the configuration of the smart phone 10 in FIG. 1. Referring to FIG. 2, the smart phone 10 includes a transmitting and receiving unit 11, a first control unit 12, a system memory 13, a driving application 14 (hereinafter, referred to as a driving APP), a memory unit 15, an image pickup unit 16, and a display unit 17. The smart phone 10 is a terminal possessed by a gas detection inspector, which creates measurement data of gas and transmits the measurement data to the operation server 40 through the communication network 30 using a gas detection APP 100 which actually drives and controls the sensor module 20 as described below.

Although the present invention provides information related to gas detection and describes the smart phone 10 as a terminal possessed by a gas detection inspector, the present invention may provide a corresponding service so that a general user may execute the driving APP of the smart phone 10, prepare and attach the sensor module 20 to the smart phone 10, and transmit a self diagnosis related to the gas detection, details of the detection and the measurement data to the operation server 40 through the communication network 30.

The transmitting and receiving unit 11 transmits and receives signals and data to and from the operation server 40 through the communication network 30 in a wireless communication method.

The first control unit 12 generally controls the transmitting and receiving unit 11, the system memory 13, the driving APP 14, the memory unit 15, the image pickup unit 16 and the display unit 17, and, particularly, stores measurement data of gas measured by the gas detection APP 100, which is a kind of driving APP 14 on the system memory 13, in the memory unit 15, and controls the transmitting and receiving unit 11 to transmit the measurement data to the operation server 40 through the communication network 30.

More specifically, the first control unit 14 allows the inspector to confirm information on a user of a house or a building, which is a target of gas detection and measurement, through a UI screen of the display unit 17 and automatically stores measurement data in the memory unit 15 when inspection through the gas detection and measurement is completed, and thus reliability of gas detection and measurement is secured.

In addition, the first control unit 12 transmits the measurement data stored in the memory unit 15 to the remote operation server 40 through the communication network 30 at predetermined intervals so that a DB may be created in the database 50 connected to the remote operation server 40.

The memory unit 15 is non-volatile memory (NVM), which continuously maintains and does not delete stored data although power is not supplied, and may be configured of Flash Memory, Magnetic Random Access Memory (MRAM), Phase-change Random Access memory (PRAM), Ferroelectric RAM (FRAM) or the like.

The image pickup unit 16 creates an image data of a place where the gas detection and measurement is performed under the control of the first control unit 12 and transfers the created image data to the first control unit 12. Accordingly, the first control unit 12 stores the image data in the memory unit 15, together with the gas measurement data, or transmits the image data to the operation server 40 by controlling the transmitting and receiving unit 11.

The display unit 17 provides data on the gas detected and measured by the inspector through the UI screen.

Figure 3:
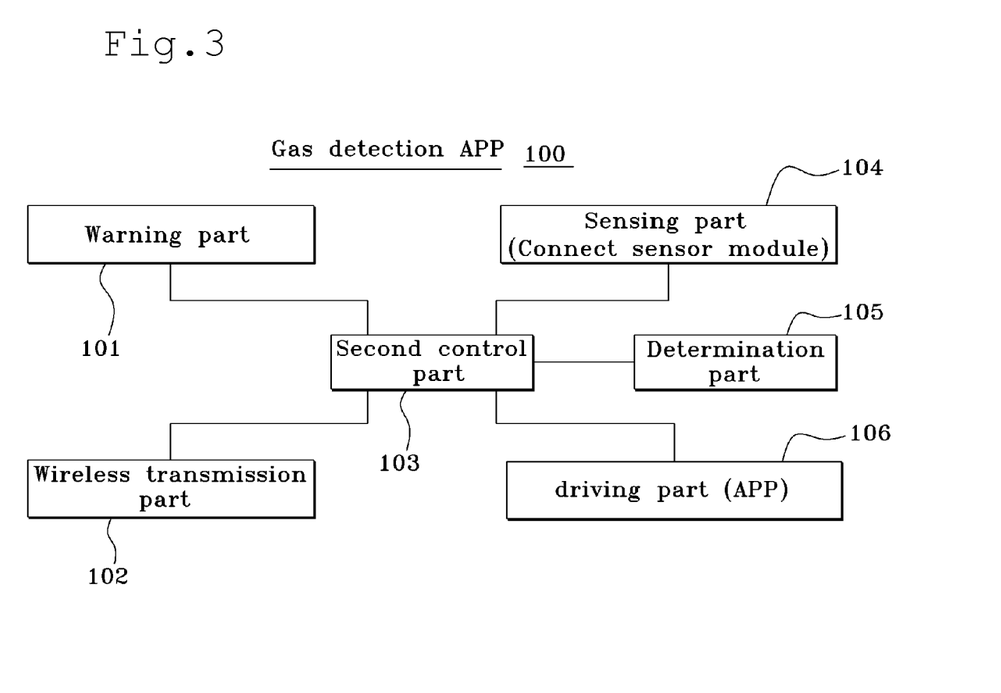
FIG. 3 is a view showing the configuration of a gas detection APP included in the driving APP in FIG. 2.

FIG. 3 is a view showing the configuration of a gas detection APP 100 included in the driving APP 14 in FIG. 2. The gas detection APP 100 includes a warning part 101, a wireless transmission part 102, a second control part 103, a sensing part 104, a determination part 105, and a driving part 106 and drives the gas detection system using the gas detection information and measurement data received from the sensor module 20 detachably mounted to the smart phone 10.

That is, after the sensor module 20 is engaged with the smart phone 10, the gas detection APP 100 confirms whether or not gas is leaking in a specific area and a desired area. The sensor module 20 is added as a sensor module or the like related to detection of agricultural chemicals and may detect and confirm details of the gas or the agricultural chemicals.

The warning part 101 informs a user of the smart phone 10 of the measurement data received from the sensor module 20 when the measurement data exceeds a threshold value as much as a dangerous level as a result of determination of the determination part 105.

The wireless transmission part 102 controls the wireless transmitting and receiving unit 11 of the smart phone 10 to transmit the measurement data received from the sensor module 20 to the operation server 40 through the communication network 30.

The second control part 103 generally controls the warning part 101, the wireless transmission part 102, the sensing part 104, the determination part 105 and the driving part 106 so as to systematically operate with one another.

The sensing part 104 is associated with the sensor module 20 through the smart phone 10 and controls the sensor module 20 so that the sensor module 20 of the smart phone 10 may detect gas.

The determination part 105 determines whether or not the measured gas data exceeds a threshold value, which indicates a dangerous level.

If it is determined that gas is detected through the sensor module 20 under the control of the control unit 103, the driving part 106 receives a wake-up signal from the sensing part 104, controls the sensor module 20 to measure measurement data on the gas, and receives the measurement data from the sensor module 20 and transmits the measurement data to the second control part 103.

Figure 4:
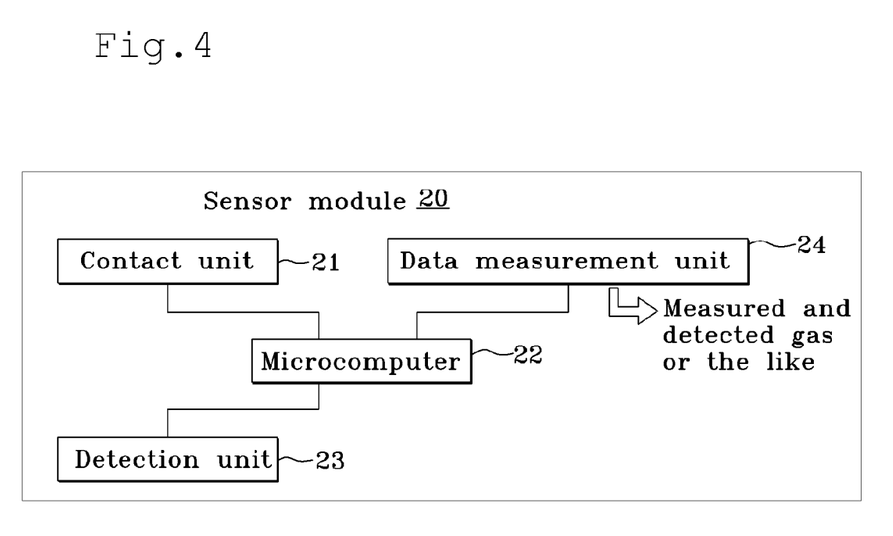
FIG. 4 is a view showing the configuration of the sensor module in FIG. 2.

FIG. 4 is a view showing the configuration of the sensor module 20 in FIG. 2. Referring to FIG. 4, the sensor module 20 includes a contact unit 21, a microcomputer 22, a detection unit 23 and a data measurement unit 24, and it is a device formed like an accessory of the smart phone 10, which actually detects and measures gas.

Meanwhile, the sensor module 20 has a minimum configuration only for detecting and measuring gas and detects and measures combustible gases (LNG, LPG, CNG, Freon and the like) and toxic gases (carbon monoxide, carbon dioxide, oxygen, alcohol and the like) among gases.

Additionally, the sensor module 20 may be configured to have a function of sensing fire, concentration of indoor pollution and the like, as well as gas, and transmits corresponding measured information to the smart phone 10 so as to perform an additional procedure of confirming location information and removing pollutants through a wireless network.

The sensor module 20 is formed in a dimension of 59×140×20 mm to be configured in a size of one third of an existing gas detector.

The contact unit 21 is a detector having built therein an RFID reader, which reads an RFID tag attached on a house or a building so that the microcomputer 22 may automatically recognize a user and an inspection location.

Meanwhile, the contact unit 21 may use an electronic tag of a near field communication (NFC) reader embedded in the smart phone, which is a non-contact type short range wireless communication module using a frequency band of 13.56 MHz, and is provided to transmit data among terminals within a short distance.

The microcomputer 22 generally controls the contact unit 21, the detection unit 23 and the data measurement unit 24. More specifically, the microcomputer 22 controls the detection unit 23 to detect gas for a user at an inspection location recognized by the contact unit 21, and if gas is detected, the microcomputer 22 creates a measurement data for the detected gas through the data measurement unit 24 and transmits the measurement data to the smart phone 10.

The detection unit 23 detects a user and gas for an inspection location recognized by the contact unit 21. Gas detected by the detection unit 23 can be divided into the following two types: combustible gases (LNG, LPG, CNG, Freon and the like) and toxic gases (carbon monoxide, carbon dioxide, oxygen, alcohol and the like) as described above.

The detection unit 23 uses at least one of a heat conductive type semiconductor sensor and an automatic suction type sensor for a combustible gas (LNG, LPG, CNG, Freon or the like).

On the other hand, the detection unit 23 uses at least one of a heat conductive type semiconductor sensor, an electrochemical sensor, and a diffusive sensor for a toxic gas (carbon monoxide, carbon dioxide, oxygen, alcohol or the like).

The data measurement unit 24 creates a measurement data through measurement of gas as the detection unit 23 detects gas.

Figure 5:
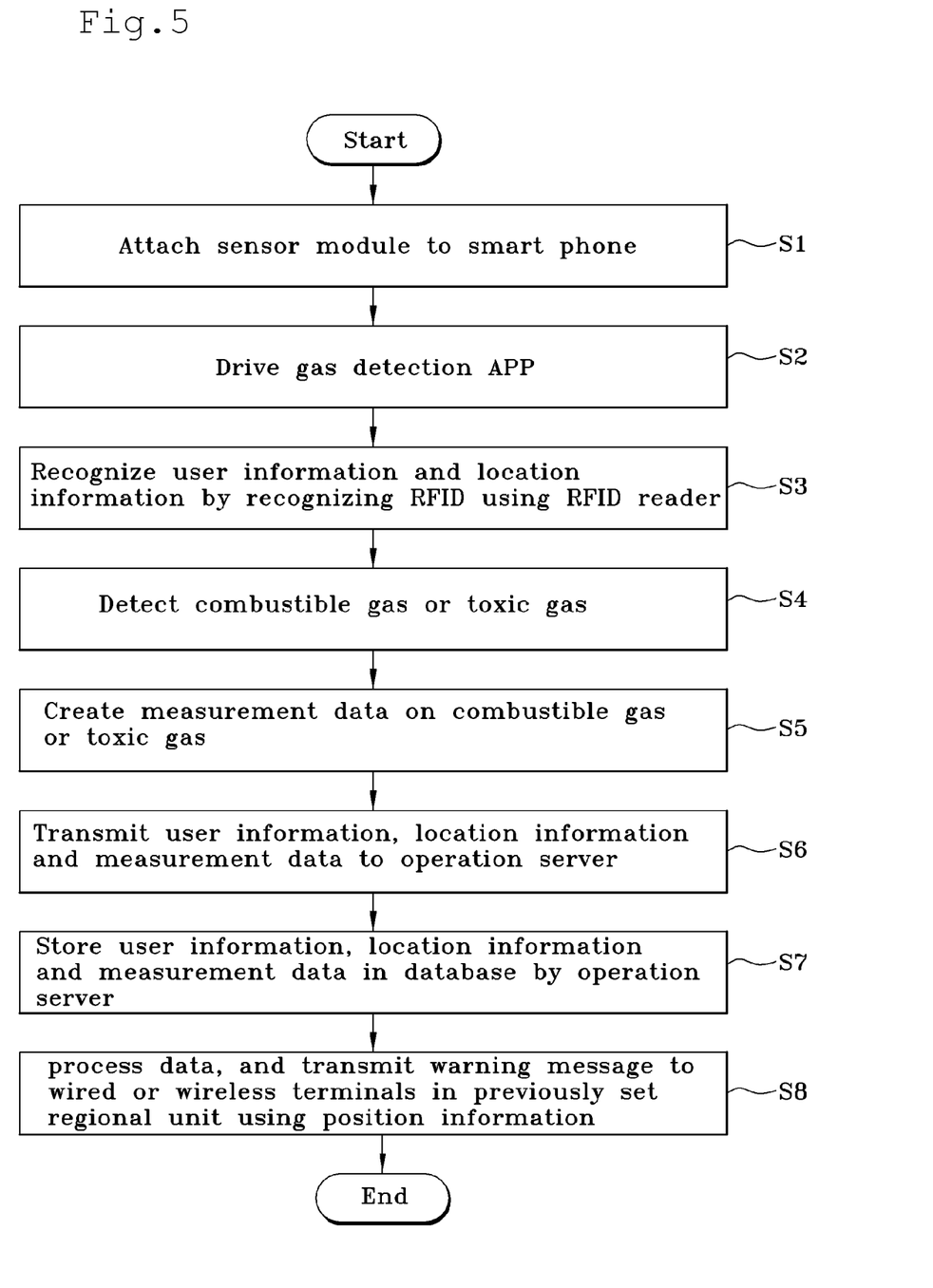
FIG. 5 is a flowchart illustrating a gas detection method using a smart phone according to an embodiment of the present invention.

FIG. 5 is a flowchart illustrating a gas detection method using a smart phone according to an embodiment of the present invention. Referring to FIGS. 1 to 5, the sensor module 20 is attached to the smart phone 10 (S1).

An inspector having the smart phone 10 drives the gas detection APP 100 (S2).

After step S2, the gas detection APP 100 automatically recognizes user information and location information S3 if the smart phone 10 reads an RFID tag attached on each house or building using the contact unit 21 having built therein an RFID reader (S3).

After step S3, the gas detection APP 100 detects a combustible gas or a toxic gas by driving the sensor module 20 (S4).

After step S4, the gas detection APP 100 acquires measurement data by measuring the combustible gas or the toxic gas detected in step S4, by driving the sensor module 20 (S5).

After step S5, the smart phone 10 transmits the user information, the location information and the measurement data acquired from the gas detection APP 100 to the operation server 40 through the communication network 30 (S6).

Accordingly, the operation server stores the user information, the location information and the measurement data received in step S6 (S7), processes data using the received information, and transmits a warning message to wired and wireless terminals positioned at a location contained in information on a regional unit previously set, centering on the location information using the information on the regional unit (S8).

As described above, the gas detection system and method using a smart phone in accordance with an embodiment of the present invention has advantageous effects in that reliability of data on the inspection location and inspection result can be secured when gas is measured for a user.

In addition, the gas detection system and method using a smart phone in accordance with another embodiment of the present invention is effective in that all the problems occurring by artificial manipulation of an input in confirming a user, i.e., an inspection target, or an input error about the user can be solved using a sensor module that can be detachably mounted to the smart phone and an application thereof.

In addition, the gas detection system and method using a smart phone in accordance with another embodiment of the present invention is effective in that measurement data measured by a sensor module performing gas detection is transmitted to an operation server so that the measurement data may be processed as special data about a combustible gas or a toxic gas.

Furthermore, the gas detection system and method using a smart phone in accordance with another embodiment of the present invention is effective in that it is possible to quickly take an action to secure stability of gas detection since information on the location of detecting gas and information on the position of the smart phone can be confirmed, and thus loss of lives and properties incurred in the gas detection can be minimized.

While the present invention has been described in connection with the exemplary embodiments illustrated in the drawings, they are merely illustrative embodiments, and the invention is not limited to these embodiments. It is to be understood that various equivalent modifications and variations of the embodiments can be made by a person having an ordinary skill in the art without departing from the spirit and scope of the present invention. Therefore, various embodiments of the present invention are merely for reference in defining the scope of the invention, and the true technical scope of the present invention should be defined by the technical spirit of the appended claims.

What is claimed is:

1. A gas detection system using a smart phone, comprising:
    a sensor module detachably mounted to the smart phone and configured to detect and measure at least one of combustible gases consisting of LNG, LPG, CNG and Freon or at least one of toxic gases consisting of carbon monoxide and carbon dioxide;
    a gas detection APP installed inside the smart phone and configured to acquire measurement data by detecting the combustible gas or the toxic gas and measuring the detected combustible gas or toxic gas through the drive of the sensor module, after automatically recognizing user information and location information by reading a tag embedded in the smart phone, i.e., a radio frequency identification (RFID) tag or a near field communication (NFC) tag indicating a user or a location of gas detection, using a contact unit having built therein an RFID reader or an NFC reader inside the smart phone, wherein the smart phone transmits the user information, the location information and the measurement data acquired from the gas detection APP to an operation server through a communication network; and
    a database configured to receive the user information, the location information and the measurement data from the operation server, and store the received user information, location information and measurement data,
    wherein the operation server creates a processed data using the user information, the location information, and the measurement data, and transmits a warning message to wired and wireless terminals positioned at a location contained in information on a regional unit using the information on the regional unit previously set, centering on the location information.

2. The gas detection system according to claim 1, wherein if the detected gas is a combustible gas, the processed data include at least one of a gas type, a degree of danger, cautions, a gas handling method, countermeasures against an emergency case, simulated trainings, PR materials of public organizations, and general information on gas safety, as the special data,
    wherein if the detected gas is a toxic gas, the processed data include at least one of information on the degree of harmfulness of the toxic gas, information on harmful gas, hazardous zones in the surroundings of life, a degree of drinking in the case of alcohol, health conditions according to drinking quantity, sharing of information on the hazardous zones, self-diagnosis in case of being exposed to a toxic gas, early measures on the hazardous zones, extraction of qualitative evaluation in the field of living environment, cautions related to health, and simplified self-diagnosis information, as the special data.

3. The gas detection system according to claim 1, wherein the smart phone comprises an image pickup unit that is configured to pick up an image data of a place where the gas detection and measurement is performed, and transmit the created image to the operation server data together with the user information, the location information and the measurement data.

4. A gas detection method using a smart phone, comprising:
    a first step of driving a gas detection APP installed inside the smart phone, after attaching a sensor module to the smart phone;
    a second step of allowing the gas detection APP to automatically recognize user information and location information by reading a tag embedded in the smart phone, i.e., a radio frequency identification (RFID) tag or a near field communication (NFC) tag indicating a user or a location of gas detection, using a contact unit having built therein an RFID reader or an NFC reader inside the smart phone;
    a third step of allowing the gas detection APP to detect a combustible gas or a toxic gas by driving the sensor module;
    a fourth step of allowing the gas detection APP to acquire measurement data by measuring the detected combustible gas or toxic gas through the drive of the sensor module;
    a fifth step of allowing the smart phone to transmit the user information, the location information and the measurement data acquired from the gas detection APP to an operation server through a communication network, and
    a sixth step of allowing the operation server to create a processed data using the user information, the location information and the measurement data, and transmit a warning message to wired and wireless terminals positioned at a location contained in information on a regional unit previously set, centering on the location information using the information on the regional unit.

* * * * *